(12) United States Patent
Seto et al.

(10) Patent No.: US 6,551,715 B1
(45) Date of Patent: Apr. 22, 2003

(54) GLASS SHEET WITH CONDUCTIVE FILM AND GLASS ARTICLE USING THE SAME

(75) Inventors: Yasunori Seto, Osaka (JP); Akira Fujisawa, Osaka (JP); Tsuyoshi Otani, Osaka (JP); Masahiro Hirata, Osaka (JP)

(73) Assignees: Nippon Sheet Glass Co., Ltd., Osaka (JP); Kaneka Corporation, Osaka (JP)

( * ) Notice: Subject to any disclaimer, the term of this patent is extended or adjusted under 35 U.S.C. 154(b) by 0 days.

(21) Appl. No.: 09/691,442

(22) Filed: Oct. 18, 2000

(30) Foreign Application Priority Data

Oct. 20, 1999 (JP) ............................................. 11-297609

(51) Int. Cl.$^7$ ............................................... B32B 17/06
(52) U.S. Cl. ...................... 428/432; 428/34; 428/212; 428/213; 428/215; 428/216; 428/332; 428/334; 428/335; 428/336; 428/689; 428/699; 428/701; 428/702; 243/252; 52/783.1; 52/786.1; 52/786.11
(58) Field of Search ................................ 428/432, 428, 428/448, 702, 699, 701, 34, 689, 212, 213, 215, 216, 332, 334, 335, 336

(56) References Cited

U.S. PATENT DOCUMENTS

| 4,206,252 A | 6/1980 | Gordon |
| 4,325,987 A | 4/1982 | Kalbskopf et al. |
| 4,399,194 A | 8/1983 | Zelez et al. |
| 4,776,870 A | 10/1988 | Meyer et al. |
| 4,853,257 A | 8/1989 | Henery |
| 4,880,698 A | 11/1989 | Thomas et al. |
| 4,952,423 A | 8/1990 | Hirata et al. |
| 5,124,180 A | 6/1992 | Proscia |
| 5,248,349 A * | 9/1993 | Foote et al. ................. 118/719 |
| 5,482,570 A * | 1/1996 | Saurer et al. ................. 136/255 |
| 5,525,406 A | 6/1996 | Goodman et al. |
| 5,750,265 A | 5/1998 | Goodman |
| 5,756,192 A | 5/1998 | Crawley et al. |
| 5,772,716 A | 6/1998 | Krohm et al. |
| 5,776,236 A | 7/1998 | Neuman et al. |
| 5,851,642 A | 12/1998 | Sauvinet et al. |
| 6,355,353 B1 * | 3/2002 | Hyodo et al. ................. 136/252 |

FOREIGN PATENT DOCUMENTS

| EP | 0 561 161 | 2/1993 |
| EP | 0 755 902 | 7/1996 |
| JP | 63-184210 A | 7/1988 |
| JP | 1-96044 A | 4/1989 |
| JP | 4-502305 A | 4/1992 |
| WO | WO 91/05743 | 5/1991 |

* cited by examiner

*Primary Examiner*—Deborah Jones
*Assistant Examiner*—A T Piziali
(74) *Attorney, Agent, or Firm*—Merchant & Gould P.C.

(57) ABSTRACT

When a transparent conductive film formed on a glass sheet is heat-treated in the air, its conductivity decreases. Even if the conductivity is increased by a heat treatment in a nitrogen atmosphere or the like beforehand, it decreases considerably by heating in the air during a processing step to obtain a final product. The present invention provides a glass sheet with a transparent conductive film, in which the increasing rate of its sheet resistance is 15% or lower even after heating at 450° C. in the air for three hours.

11 Claims, 4 Drawing Sheets

GLASS SHEET WITH CONDUCTIVE FILM AND GLASS ARTICLE USING THE SAME

BACKGROUND OF THE INVENTION

1. Field of the Invention

The present invention relates generally to a glass sheet with a transparent conductive film in which a transparent conductive film is formed on a surface of a glass sheet. More particularly, the present invention relates generally to a glass sheet with a transparent conductive film having a low rate of change in sheet resistance before and after a heat treatment and to glass articles using the same.

2. Related Background Art

A glass sheet with a transparent conductive film formed thereon is used widely as a transparent conductor for a photovoltaic device such as a solar cell or the like and an image display device such as a liquid crystal display, a plasma display panel, or the like. For a building window, the glass sheet with a transparent conductive film is used as low-emissivity glass (Low-E glass), electromagnetic wave shielding glass, or the like. Similarly, for a vehicle window or a display-type refrigerator in shops, it is used as heat shading glass, glass with a defogger, or the like. As the transparent conductive film, a tin oxide film doped with a trace component such as fluorine, antimony, or the like, an indium tin oxide (ITO) film, or the like has been known. The transparent conductive film can be formed by a physical vapor deposition method such as a vacuum vapor deposition method, a sputtering method or the like, but it also can be formed by a spray method or a chemical vapor deposition (CVD) method accompanied by a thermal decomposition and oxidation reaction (a pyrolytic oxidation reaction).

Depositing a transparent conductive film on a glass sheet production line in a float process by the CVD method also has been known. For instance, JP 1-96044 A discloses a method of depositing a tin oxide film on a glass ribbon in a float bath. According to JP 1-96044 A, the tin oxide film deposited by this method has the lowest sheet resistance in a certain film thickness. JP 1-96044 A also describes the range of 200 to 350 nm as the thickness of the tin oxide film. In addition, JP 4-502305 A discloses the method of depositing a tin oxide film in a float bath and specifically describes a tin oxide film thickness of about 220 nm.

A transparent conductive film deposited by a pyrolytic oxidation reaction of a coating-film forming material, particularly a tin oxide film, is excellent in chemical resistance and can be formed with inexpensive raw materials. In general, however, the pyrolytic oxidation reaction makes it difficult to obtain a transparent conductive film with high conductivity (low specific resistance).

JP 63-184210 discloses a method for improving the conductivity of a transparent conductive film deposited by the pyrolytic oxidation reaction, through a heat treatment in a nitrogen atmosphere or a hydrogen atmosphere. JP 63-184210 also describes an example in which a sheet resistance of a tin oxide film with a thickness of about 200 nm is decreased by the heat treatment.

According to the method described in JP 63-184210, the sheet resistance of a transparent conductive film certainly is decreased once. In many cases, however, a glass sheet with a transparent conductive film formed thereon is reheated in a step to obtain a final product. For instance, a bending and/or tempering treatment of a glass sheet is conducted with the glass sheet being heated. In the manufacturing process of a multiple-glazing unit, a sealant requiring heating may be used in some cases. In a photovoltaic device or an image display device, a glass substrate with a transparent conductive film may be heated in a step of processing the substrate in some cases. Frequently, these heating processes are conducted in the air. When the substrate is heated in the air, the sheet resistance of the transparent conductive film such as a tin oxide film or the like tends to increase.

When the transparent conductive film is preheated in a nitrogen atmosphere or a hydrogen atmosphere, greater change in sheet resistance is caused after a heat treatment in the air. Consequently, the preheating instead provides uncertainty with respect to the conductivity of the transparent conductive film. Such uncertainty is not desirable for stabilizing characteristics of a final product.

SUMMARY OF THE INVENTION

The present invention is intended to provide a glass sheet with a transparent conductive film having characteristics that the change in conductivity due to heating in the air is suppressed while having high conductivity so that a final product is provided with stable characteristics.

In order to achieve the above-mentioned object, initially, the present inventors assume a heat treatment at 450° C. in the air as a heat treatment required for processing the glass sheet. When a conventional glass sheet with a transparent conductive film is heat-treated for about three hours under this usual condition, the sheet resistance increases considerably. However, when consideration is given to the steps of processing the glass sheet with a transparent conductive film, it is desirable that the sheet resistance does not change greatly even after it is treated using such heating temperature and heating time as described above.

In order to secure the conductivity of the transparent conductive film, the present inventors set the thickness of the transparent conductive film to be at least 360 nm, preferably at least 400 nm instead of employing the preheating in a nitrogen atmosphere or a hydrogen atmosphere. The decrease in sheet resistance through the increase in thickness of the transparent conductive film tends not to be affected easily by the heat treatment in the air. Furthermore, the present inventors studied various aspects of the structure of an intermediate film formed between a transparent conductive film and a glass sheet, film formation conditions of the transparent conductive film, or the like. As a result, the present inventors succeeded in suppressing the rate of change in the sheet resistance of the transparent conductive film due to the heat treatment to a level of 15% or lower when taking the sheet resistance before the heat treatment as a reference.

DETAILED DESCRIPTION OF THE INVENTION

Preferable embodiments of a glass sheet with a transparent conductive film of the present invention are described as follows.

As the transparent conductive film, a film containing an oxide as a main component, particularly tin oxide as the main component, is preferable. In the present specification, the "main component" denotes a component accounting for at least 50 wt. % of the whole amount. In the transparent conductive film, it is preferred to increase its conductivity by suitably adding a trace component such as fluorine, antimony, or the like thereto. It is preferable that the transparent conductive film has a thickness of at least 360 nm, more preferably at least 370 nm, particularly at least 400 nm. The upper limit of the thickness of the transparent conductive film is not particularly limited, but about 1200 nm is suitable as the upper limit.

It is preferable that an intermediate film is present between the glass sheet and the transparent conductive film. The intermediate film serves as an alkaline barrier layer for suppressing the diffusion of an alkaline component contained in the glass sheet into the transparent conductive film. In order to suppress the increase in the sheet resistance of the transparent conductive film due to the diffused alkaline component, it is preferred to form at least two intermediate films between the glass sheet and the transparent conductive film.

Figure 1:
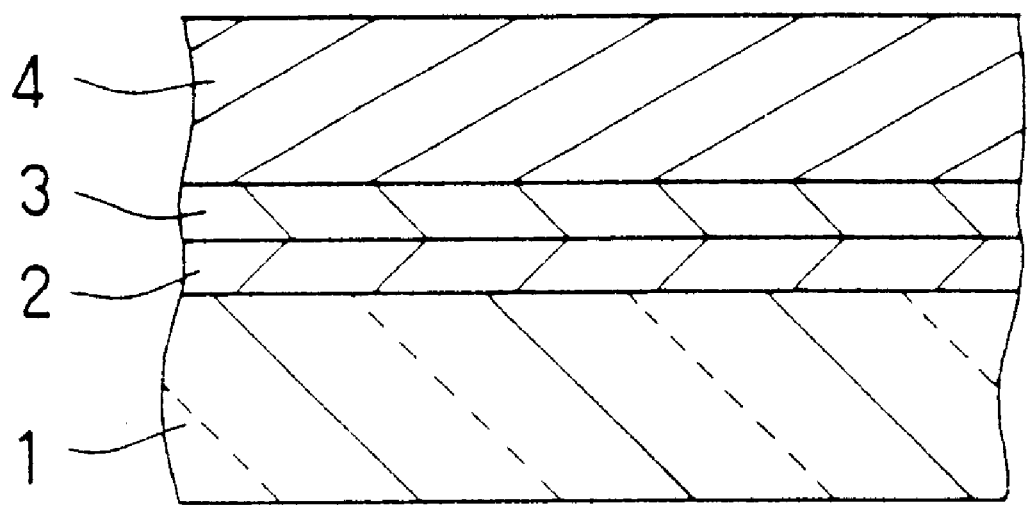
FIG. 1 is a sectional view of an embodiment of a glass sheet with a transparent conductive film according to the present invention.

An embodiment with two intermediate films is described further in detail with reference to FIG. 1. As a first intermediate film 2 adjacent to the glass sheet 1, for instance, a film containing tin oxide as the main component is preferable. As a second intermediate film 3 stacked on the first intermediate film 2, for example, a film containing at least one selected from silicon oxide and aluminum oxide as the main component is preferable, and particularly, a film containing silicon oxide as the main component is suitable. In both the intermediate films, a preferable thickness is in the range between 5 nm and 50 nm. When the intermediate films are too thin, the alkaline barrier function may be deteriorated, thus causing a possibility that the sheet resistance of a transparent conductive film 4 is decreased considerably. On the other hand, when the intermediate films are too thick, optical characteristics or appearance of the glass sheet with a transparent conductive film may be deteriorated in some cases. The intermediate films may contain a trace component such as fluorine, chlorine, or the like. Besides the trace components described above, the transparent conductive film and the intermediate films may contain iron, nickel, cobalt, chromium, vanadium, niobium, molybdenum, lanthanum, titanium, tungsten, zinc, or the like.

For the formation of the transparent conductive film, a method accompanied by a pyrolytic oxidation reaction of a coating-film forming material, such as a spray method, a CVD method, or the like, is suitable. Examples of the spray method include a solution spray method, a dispersion spray method and a powder spray method. In the solution spray method, a solution containing a metallic compound is sprayed on a high-temperature glass sheet. In the dispersion spray method, a dispersion obtained by dispersing fine grains of a metallic compound in a liquid is used instead of the above-mentioned solution. In the powder spray method, powder of a metallic compound is used instead of the above-mentioned solution. On the other hand, in the CVD method, vapor of coating-film forming materials is supplied to a surface of the glass sheet.

The spray method is advantageous in that it can be carried out with a simpler device, but it is not easy to provide uniform film thickness due to the difficulty in controlling droplets or products to be exhausted (a reaction product, an undecomposed product, or the like). In addition, distortion may occur considerably in the glass. Therefore, as a method of forming the transparent conductive film, overall, the CVD method is superior to the other methods.

When using the CVD method, the transparent conductive film can be formed by supplying a gaseous material onto a glass sheet that has been cut to have a predetermined size and has been heated. For instance, the glass sheet placed on a mesh belt is passed through a furnace to be heated to a predetermined temperature and the coating-film forming material is supplied to the surface of the glass sheet to react using the heat of the glass sheet, thus forming the transparent conductive film. When using the CVD method or the like, it is preferable that the transparent conductive film is formed on a glass ribbon during a manufacturing process of the glass sheet by the float process. According to this preferable manufacturing method, thermal energy in forming the glass sheet can be utilized. This preferable method is advantageous in forming a large area film.

In forming a transparent conductive film by a method accompanied by a pyrolytic oxidation reaction such as the CVD method or the like, a suitable temperature of a glass sheet is in the range between 400° C. and 700° C., but in order to suppress the change in sheet resistance, it is preferable that the glass sheet has a higher temperature, specifically at least 600° C., particularly at least 620° C. It is not completely clear why the change in sheet resistance is suppressed when the transparent conductive film is formed at a high temperature. However, it is conceivable that the structural changes due to the heat treatment such as the variation in crystal grain size, rearrangement of impurities and the like tend not to be caused easily. Such structural changes also are not desirable in the intermediate films. Therefore, it is preferred to form the intermediate films on a glass sheet with a temperature of at least 600° C., particularly at least 620° C. by the pyrolytic oxidation reaction of a coating-film forming material, particularly by the CVD method.

When being formed on a glass ribbon during the manufacturing process of the glass sheet, a film can be formed with high efficiency while a high temperature of the substrate is maintained. Particularly, when the CVD method is carried out inside a float bath, a film can be formed even on a glass surface having a temperature equal to or higher than the softening point. Furthermore, in the film formation inside a float bath, preferable results with respect to a film growth rate and material reaction efficiency also can be obtained. In addition, defects such as pinholes in the film can be suppressed. Moreover, the intermediate films and the transparent conductive film can be formed successively at a high temperature such as described above.

Figure 2:
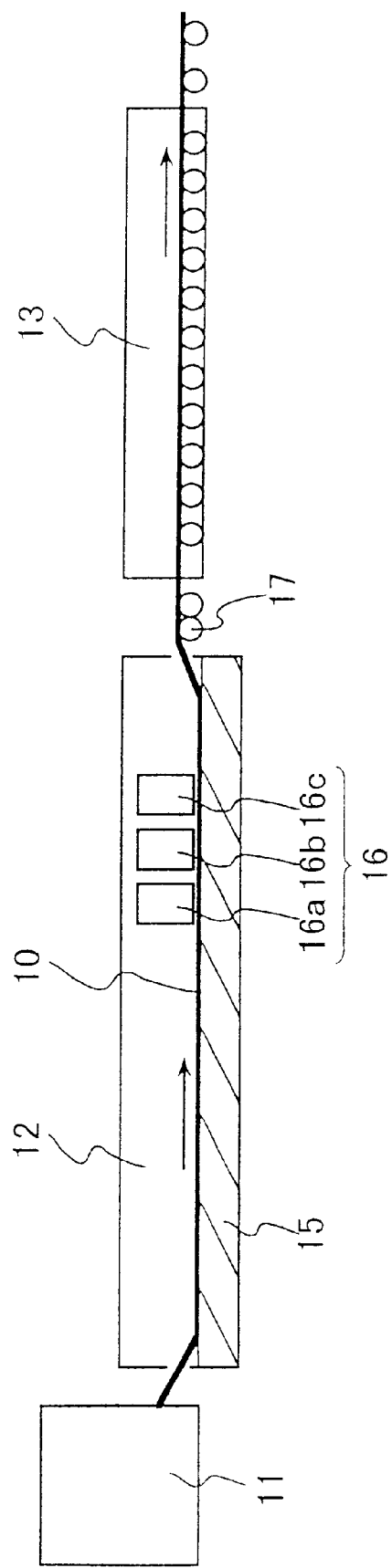
FIG. 2 shows a structural example of a device used for forming a transparent conductive film on a glass ribbon in a float process.

The following description is directed to a method of forming films on a glass sheet production line by the float process. FIG. 2 shows an embodiment of a device used for forming a film on a glass ribbon in the float process by the CVD method. As shown in FIG. 2, in this device, a predetermined number of coaters 16 (three coaters 16a, 16b and 16c in the embodiment shown in the figure) are placed inside a float bath 12 at a predetermined distance from the surface of a glass ribbon 10. The glass ribbon 10 is formed from molten glass, which is poured from a melting furnace 11 into the float bath 12, in a belt-like form on a tin bath 15 while traversing the length of the float bath 12. These coaters supply gaseous materials to form coating films on the glass ribbon 10 continuously. When a plurality of coaters are used, a plurality of films can be stacked on the glass ribbon 10 successively by the CVD method. The temperature of the glass ribbon is adjusted by a heater and a cooler (not shown in the figure) arranged inside the float bath so that the glass ribbon has a predetermined temperature directly before reaching the coaters 16. The glass ribbon 10 on which coating films including a transparent conductive film have been formed is lifted by a roller 17 and is carried into an annealing furnace 13. The glass ribbon 10 annealed in the annealing furnace 13 is cut by a cutting device, which generally is used in the float process and is not shown in the figure, thus obtaining a glass sheet with a predetermined size.

Examples of tin materials for the transparent conductive film deposited by the CVD method include tin tetrachloride, dimethyltin dichloride (DMT), dibutyltin dichloride, tetramethyltin, tetrabutyltin, dioctyltin dichloride, monobutyltin trichloride (MBTC), dibutyltin diacetate or the like. Oxidation materials used for obtaining tin oxide from a tin material include oxygen, water vapor, dry air, or the like. Fluorine materials include hydrogen fluoride, trifluoroacetic acid, bromotrifluoromethane, chlorodifluoromethane, difluoroethane, or the like. When antimony is to be added, antimony pentachloride, antimony trichloride, or the like may be used.

Silicon materials used when a silicon oxide film is deposited as an intermediate film by the CVD method include silane (monosilane), disilane, trisilane, monochlorosilane, dichlorosilane, 1,2-dimethylsilane, 1,1,2-trimethyldisilane, 1,1,2,2-tetramethyl disilane, or the like. In this case, oxidizers include oxygen, water vapor, dry air, carbon dioxide, carbon monoxide, nitrogen dioxide, or the like.

When silane is used, for the purposes of preventing the silane from reacting before reaching the glass surface and controlling the refractive index of the silicon oxide film, an unsaturated hydrocarbon gas such as ethylene, acetylene, toluene, or the like may be added.

Similarly, examples of tin materials used when a tin oxide film is deposited as an intermediate film by the CVD method include tin tetrachloride, dimethyltin dichloride (DMT), dibutyltin dichloride, tetramethyltin, tetrabutyltin, dioctyltin dichloride, monobutyltin trichloride (MBTC), dibutyltin diacetate or the like. Oxidation materials used for obtaining tin oxide from a tin material include oxygen, water vapor, dry air, or the like. To this tin oxide film, fluorine or antimony may be added.

When using the above-mentioned method, even if a heat treatment is conducted at 450° C. in the air for three hours, a glass sheet with a transparent conductive film having a rate of change in sheet resistance suppressed to a level of 15% or lower, particularly 10% or lower, can be manufactured. It is preferable that the glass sheet with a transparent conductive film has a sheet resistance of 25 $\Omega$/sq. ($\Omega/\square$) or lower, particularly 20 $\Omega$/sq. or lower before the heat treatment.

This glass sheet with a transparent conductive film can be used not only for various glass articles in which a glass sheet with a transparent conductive film formed thereon conventionally has been used, but also for the other glass articles. The following description is directed to a solar cell and a double-glazing unit as examples of the glass articles.

Figure 3:
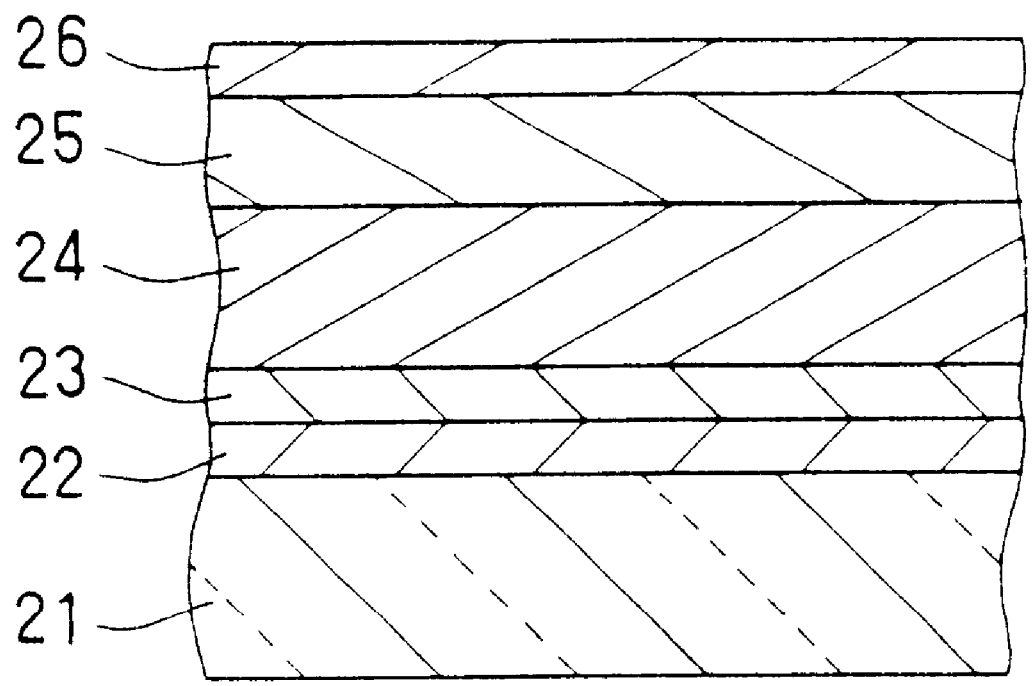
FIG. 3 is a sectional view showing an example of an amorphous silicon solar cell using the glass sheet with a transparent conductive film of the present invention.

FIG. 3 is a sectional view of an example of an amorphous silicon solar cell using a glass sheet with a transparent conductive film of the present invention. In this amorphous silicon solar cell, a first intermediate film 22, a second intermediate film 23 and a transparent conductive film 24 are formed sequentially on a glass sheet 21. On the transparent conductive film 24, an amorphous silicon (a-Si:H) layer 25 is formed as a photoelectric conversion layer. The amorphous silicon (a-Si:H) layer 25 is formed using monosilane diluted with a hydrogen gas as a raw material by a plasma CVD method utilizing glow discharge. The amorphous silicon layer 25 is formed of a p-type layer (with a thickness of about 10 nm), an i-type layer (with a thickness of about 300 to 350 nm) and an n-type layer (with a thickness of about 40 nm) that are stacked sequentially from the transparent conductive film side so that a pin junction is formed. On the surface of the amorphous silicon layer 25, a metal electrode layer 26 is formed. In a manufacturing process of an amorphous silicon solar cell, a transparent conductive film goes through respective washing, drying and baking steps before the a-Si:H layer is formed thereon. In baking, generally, the transparent conductive film is heated at about 450° C. in the air. This baking is carried out for removing dirt remaining on the transparent conductive film even after the washing step and improving crystallinity of the transparent conductive film.

Figure 4:
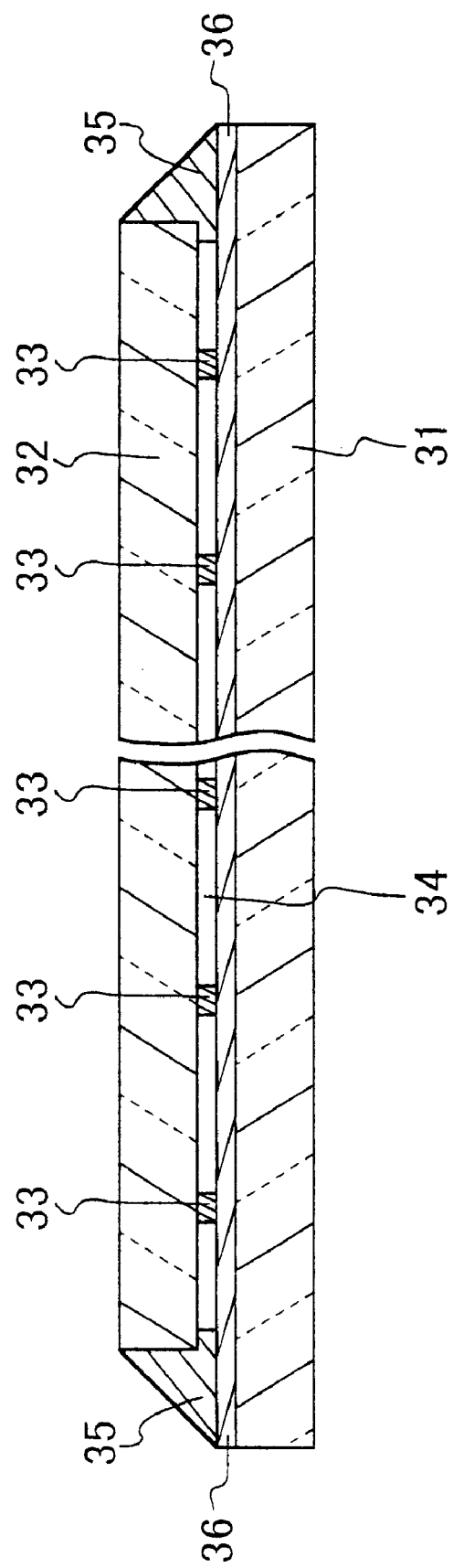
FIG. 4 is a sectional view showing an example of a double-glazing unit using the glass sheet with a transparent conductive film of the present invention.

FIG. 4 shows an example of a glazing unit using a glass sheet with a transparent conductive film according to the present invention, which is formed of a pair of glass sheets insulated from each other by a space with a reduced pressure and is a so-called vacuum insulating glazing unit. In this vacuum insulating glazing unit, while a number of columnar spacers 33 are provided between a pair of glass sheets 31 and 32 to maintain the interval between them, the pressure between the glass sheets is reduced via a through hole provided in the glazing unit, which is not shown in the figure. A preferable air pressure in a reduced pressure layer 34 thus formed is, for example, 1.0 Pa or lower, particularly 0.1 Pa or lower. The reduced pressure layer 34 is pre-sealed with a sealant 35 placed along the peripheries of the glass sheets 31 and 32. As the sealant 35, a low melting point glass (with, for example, a melting point of 400 to 600° C.) is suitable. This low melting point glass is heated to a temperature exceeding its softening point when the reduced pressure layer 34 is sealed.

As shown in FIG. 4, as a glass sheet 31, a glass sheet with a transparent conductive film of the present invention is used. A coating film 36 including the transparent conductive film is positioned on the reduced pressure layer side. In this case, although it is not shown in the figure, it is preferable that the coating film 36 includes two intermediate films when the glass sheet with a transparent conductive film is used for a double-glazing unit. When using the vacuum insulating glazing unit, since the pressure between the glass sheets is reduced, a great heat insulating effect can be obtained even when the interval between the glass sheets is narrow. This insulating effect further is improved by using a glass sheet with a transparent conductive film as one of the glass sheets. Furthermore, in the glass sheet with a transparent conductive film of the present invention, the sheet resistance does not increase considerably even after a heat treatment is carried out for the sealing or the like and in addition, its performance as Low-E glass does not deteriorate easily.

EXAMPLES

The present invention is described further in detail using examples as follows, but is not limited by the following examples.

Example 1

Using the same device as that shown in FIG. 2, the coating films described below are deposited on a glass ribbon by the CVD method. Soda-lime silica glass with a general sheet glass composition melted by being heated to 1500 to 1600° C. in a melting furnace was poured into a float bath. The glass ribbon had a temperature of about 600 to 750° C. in the float bath and had a temperature of about 650° C. in a location where the coating films are deposited on the glass ribbon.

From a first coater positioned on the furthest upstream side in the float bath, a mixed gas containing dimethyltin dichloride (vapor), oxygen and nitrogen was supplied to deposit a tin oxide film (a $SnO_2$ film) with a thickness of 35 nm. Then, from the second coater, a mixed gas containing monosilane, ethylene, oxygen and nitrogen was supplied to deposit a silicon oxide film (a $SiO_2$ film) with a thickness of about 25 nm on the $SnO_2$ film. Subsequently, from the third coater, a mixed gas containing dimethyltin dichloride (vapor), oxygen, nitrogen, helium and hydrogen fluoride (vapor) was supplied to deposit a fluorine-doped tin oxide film (a $SnO_2$:F film) with a thickness of about 690 nm on the $SiO_2$ film. After the film deposition, the glass ribbon was annealed in an annealing furnace and was cut to a predetermined size by a cutting device positioned on the further downstream side.

The transparent conductive film (the $SnO_2$:F film) thus obtained had a sheet resistance of 9.9 Ω/sq.

Next, this glass sheet with a transparent conductive film was heat-treated at 450° C. in the air for three hours. The transparent conductive film after the heat treatment had a sheet resistance of 9.9 Ω/sq., which was the same as that before the heat treatment.

Example 2

From a first coater positioned on the furthest upstream side in the float bath, a mixed gas containing monobutyltin trichloride (vapor), oxygen, nitrogen and helium was supplied to deposit a $SnO_2$ film with a thickness of 25 nm. Then, from the second coater, a mixed gas containing monosilane, ethylene, oxygen and nitrogen was supplied to deposit a $SiO_2$ film with a thickness of 25 nm on the $SnO_2$ film. Subsequently, from the third coater, a mixed gas containing monobutyltin trichloride (vapor), oxygen, nitrogen and hydrogen fluoride (vapor), which has a different gas composition from that in the example 1, was supplied to deposit a $SnO_2$:F film with a thickness of about 690 nm on the $SiO_2$ film. After the film deposition, the glass ribbon was annealed in an annealing furnace and was cut to a predetermined size by a cutting device positioned on the further downstream side.

The transparent conductive film (the $SnO_2$:F film) thus obtained had a sheet resistance of 13.6 Ω/sq.

Next, this glass sheet with a transparent conductive film was heat-treated at 450° C. in the air for three hours. The transparent conductive film after the heat treatment had a sheet resistance of 14.4 Ω/sq.

Comparative Example 1

A no-alkali glass sheet (#7059, manufactured by Corning Inc.) with a thickness of 1.1 mm that had been cut to have a size of 10 cm×10 cm was washed and then was dried. On this glass sheet, a $SnO_2$:F film with a thickness of 600 nm was deposited in a belt furnace by a CVD method. The deposition was carried out as follows. A mixed gas containing dimethyltin dichloride (vapor), oxygen, nitrogen and trifluoroacetic acid (vapor) was supplied from a coater placed inside the furnace heated to about 550° C. while the glass sheet was carried on a mesh belt.

The transparent conductive film (the $SnO_2$:F film) thus obtained had a sheet resistance of 19.0 Ω/sq.

Next, this glass sheet with a transparent conductive film was heat-treated at 450° C. in the air for three hours. The transparent conductive film after the heat treatment had a sheet resistance of 23.0 Ω/sq.

Comparative Example 2

A soda-lime glass sheet with a thickness of 3 mm that had been cut to have a size of 10 cm×10 cm was washed and then was dried. On this glass sheet, a $SiO_2$ film with a thickness of 20 nm and subsequently a $SnO_2$:F film with a thickness of 800 nm were deposited in a belt furnace by the CVD method. The deposition was carried out as follows. While the glass sheet was carried on a mesh belt inside the furnace heated up to about 550° C., from coaters placed inside the furnace, in depositing the $SiO_2$ film, a mixed gas containing monosilane, ethylene, oxygen and nitrogen was supplied and in depositing the $SnO_2$:F film, a mixed gas containing monobutyltin trichloride (vapor), oxygen, nitrogen and trifluoroacetic acid (vapor) was supplied.

The transparent conductive film (the $SnO_2$:F film) thus obtained had a sheet resistance of 11.0 Ω/sq.

Next, this glass sheet with a transparent conductive film was heat-treated at 450° C. in the air for three hours. The transparent conductive film after the heat treatment had a sheet resistance of 26.1 Ω/sq.

Table 1 shows the results obtained from the examples and comparative examples described above together with the increasing rate of sheet resistance.

TABLE 1

| | Sheet Resistance (Ω/sq.) | | Increasing |
| --- | --- | --- | --- |
| | Before Heat Treatment | After Heat Treatment | Rate (%) |
| Example 1 | 9.9 | 9.9 | 0 |
| Example 2 | 13.6 | 14.4 | 5.9 |
| Comparative Example 1 | 19.0 | 23.0 | 21.1 |
| Comparative Example 2 | 11.0 | 26.1 | 137.3 |

No change in visible light transmittance before and after the heat treatment was observed in the glass sheets with a transparent conductive film obtained in the examples 1 and 2 and the comparative examples 1 and 2.

Comparative Example 3

A soda-lime glass sheet with a thickness of 3 mm that had been cut to have a size of 10 cm×10 cm was washed and then was dried. On this glass sheet, a $SiO_2$ film with a thickness of 20 nm and subsequently a $SnO_2$:F film with a thickness of 920 nm were deposited in a belt furnace by the CVD method. The deposition was carried out as follows. While the glass sheet was carried on a mesh belt inside the furnace heated up to about 550° C., from coaters placed inside the furnace, in depositing the $SiO_2$ film, a mixed gas containing monosilane, ethylene, oxygen and nitrogen was supplied and in depositing the $SnO_2$:F film, a mixed gas containing monobutyltin trichloride (vapor), oxygen, nitrogen and trifluoroacetic acid (vapor) was supplied.

The transparent conductive film (the $SnO_2$:F film) thus obtained had a sheet resistance of 10.2 Ω/sq.

Next, this glass sheet with a transparent conductive film was heat-treated at 450° C. in a nitrogen gas stream for three hours. After the heat treatment, the sheet resistance of the $SnO_2$:F film was reduced to 7.4 Ω/sq. Furthermore, the glass sheet with this $SnO_2$:F film formed thereon was heat-treated at 450° C. in the air for three hours and after that, the $SnO_2$:F film had a sheet resistance of 12.8 Ω/sq. The sheet resistance of the $SnO_2$:F film was changed through the heat treatments in the nitrogen gas stream and the air by 25.5% when the sheet resistance before the heat treatments is taken as a reference.

As described above, the present invention can provide a glass sheet with a transparent conductive film in which the change in conductivity due to the heat treatment in the air is suppressed. When using this glass sheet with a transparent conductive film, performances of various devices can be improved and stabilized.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A glass sheet with a transparent conductive film, comprising:

a glass sheet; and a transparent conductive film with a thickness of at least 400 nm to 1200 nm formed on the glass sheet, said transparent conductive film including a tin oxide as a main component, wherein the transparent conductive film is formed on the glass sheet or a glass ribbon during a manufacturing process of the glass sheet at a temperature of 600° C. or more, and an increase in sheet resistance of the transparent conductive film due to a heat treatment at 450° C. in the air for three hours is 15% or lower when the sheet resistance before the heat treatment is taken as a reference; wherein between the transparent conductive film and the glass sheet, a first intermediate film with a thickness of 5 nm to 50 nm and a second intermediate film with a thickness of 5 nm to 50 nm are formed sequentially from a side of the glass sheet; and said first intermediate film includes tin oxide as a main component and said second intermediate film includes a main component selected from the group of silicon oxide and aluminum oxide.

2. The glass sheet with a transparent conductive film according to claim 1, wherein the sheet resistance of the transparent conductive film before the heat treatment is 25 Ω/sq. or lower.

3. The glass sheet with a transparent conductive film according to claim 1, wherein both the first and the second intermediate film and the transparent conductive film are formed by a pyrolytic oxidation reaction of a coating-film forming material on a glass sheet or a glass ribbon during a manufacturing process of the glass sheet, which has a temperature of at least 600° C.

4. A solar cell, comprising:

a glass sheet with a transparent conductive film according to claim 1; and a photoelectric conversion layer, wherein the photoelectric conversion layer is formed on the transparent conductive film.

5. A multiple-glazing unit, comprising:

a plurality of glass sheets; and an inner layer of a reduced pressure layer, wherein the plurality of glass sheets are positioned to oppose each other via the inner layer, and at least one of the plurality of glass sheets is a glass sheet with a transparent conductive film according to claim 1.

6. A glass sheet with a transparent conductive film, comprising:

a glass sheet; and a transparent conductive film with a thickness of at least 400 nm to 1200 nm formed on the glass sheet, said transparent conductive film including a tin oxide as a main component, wherein the transparent conductive film is formed on the glass sheet or a glass ribbon during a manufacturing process of the glass sheet at a temperature of 600° C. or more, and an increase in sheet resistance of the transparent conductive film due to a heat treatment at 450° C. in the air for three hours is 15% or lower when the sheet resistance before the heat treatment is taken as a reference; wherein between the transparent conductive film and the glass sheet, a first intermediate film with a thickness of 5 nm to 50 nm and a second intermediate film with a thickness of 5 nm to 50 nm are formed sequentially from a side of the glass sheet;

said first intermediate film includes tin oxide as a main component and said second intermediate film includes a main component selected from the group of silicon oxide and aluminum oxide; and said sheet resistance of the transparent conductive film before the heat treatment is 25 Ω/sq. or lower.

7. A glass sheet with a transparent conductive film, comprising:

a glass sheet;

a transparent conductive film with a thickness of at least 400 nm to 1200 nm formed on the glass sheet, said transparent conductive film including tin oxide as a main component, wherein the transparent conductive film is formed on the glass sheet or a glass ribbon during a manufacturing process of the glass sheet at a temperature of 600° C. or more, and an increase in sheet resistance of the transparent conductive film due to a heat treatment at 450° C. in the air for three hours is 15% or lower when the sheet resistance before the heat treatment is taken as a reference; wherein between the transparent conductive film and the glass sheet, a first intermediate film with a thickness of 5 nm to 50 nm and a second intermediate film with a thickness of 5 nm to 50 nm are formed sequentially from a side of the glass sheet;

said first intermediate film includes tin oxide as a main component and said second intermediate film includes a main component selected from the group of silicon oxide and aluminum oxide; and both the first and the second intermediate film and the transparent conductive film are formed by a pyrolytic oxidation reaction of a coating-film forming material on a glass sheet or a glass ribbon during a manufacturing process of the glass sheet, which has a temperature of at least 600° C.

8. A solar cell, comprising:

a glass sheet with a transparent conductive film according to claim 6; and a photoelectric conversion layer, wherein the photoelectric conversion layer is formed on the transparent conductive film.

9. A solar cell, comprising:

a glass sheet with a transparent conductive film according to claim 7; and a photoelectric conversion layer, wherein the photoelectric conversion layer is formed on the transparent conductive film.

10. A multiple-glazing unit, comprising:

a plurality of glass sheets; and an inner layer of a reduced pressure layer;

wherein the plurality of glass sheets are positioned to oppose each other via the inner layer, and at least one of the plurality of glass sheets is a glass sheet with a transparent conductive film according to claim 6.

11. A multiple-glazing unit, comprising:

a plurality of glass sheets; and an inner layer of a reduced pressure layer;

wherein the plurality of glass sheets are positioned to oppose each other via the inner layer, and at least one of the plurality of glass sheets is a glass sheet with a transparent conductive film according to claim 7.

\* \* \* \* \*